(12) United States Patent
Hunt et al.

(10) Patent No.: US 10,700,954 B2
(45) Date of Patent: Jun. 30, 2020

(54) SCHEDULING MEMORY BANDWIDTH BASED ON QUALITY OF SERVICE FLOORBACKGROUND

(71) Applicant: ADVANCED MICRO DEVICES, INC., Santa Clara, CA (US)

(72) Inventors: Douglas Benson Hunt, Fort Collins, CO (US); Jay Fleischman, Fort Collins, CO (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 221 days.

(21) Appl. No.: 15/849,266

(22) Filed: Dec. 20, 2017

(65) Prior Publication Data
US 2019/0190805 A1    Jun. 20, 2019

(51) Int. Cl.
| | |
|---|---|
| *G06F 9/44* | (2018.01) |
| *H04L 12/26* | (2006.01) |
| *G06F 11/30* | (2006.01) |
| *G06F 11/34* | (2006.01) |
| *G06F 9/50* | (2006.01) |

(52) U.S. Cl.
CPC ........ *H04L 43/0852* (2013.01); *G06F 9/5011* (2013.01); *G06F 11/3024* (2013.01); *G06F 11/348* (2013.01); *G06F 11/3433* (2013.01); *G06F 9/5027* (2013.01); *G06F 2201/88* (2013.01); *G06F 2212/60* (2013.01); *G06F 2212/62* (2013.01)

(58) Field of Classification Search
CPC ....................................................... G06F 9/44
See application file for complete search history.

(56) References Cited

U.S. PATENT DOCUMENTS

| | | | |
|---|---|---|---|
| 2006/0004983 A1* | 1/2006 | Tsao ..................... | G06F 12/1081 711/202 |
| 2009/0228589 A1* | 9/2009 | Korupolu ............ | H04L 67/1097 709/226 |
| 2013/0042307 A1* | 2/2013 | Imamura ............... | H04L 67/325 726/4 |
| 2013/0128682 A1* | 5/2013 | Henderson ........ | G11C 11/40611 365/222 |
| 2013/0297906 A1 | 11/2013 | Loh et al. | |

(Continued)

FOREIGN PATENT DOCUMENTS

WO    2014113225 A1    7/2014

OTHER PUBLICATIONS

Lo, David, et al., "Heracles: Improving Resource Efficiency at Scale". Proceedings of the 42nd Annual International Symposium on Computer Architecture, Jun. 13-17, 2015, 13 pages.

(Continued)

*Primary Examiner* — Jae U Jeon

(57) ABSTRACT

A system includes a multi-core processor that includes a scheduler. The multi-core processor communicates with a system memory and an operating system. The multi-core processor executes a first process and a second process. The system uses the scheduler to control a use of a memory bandwidth by the second process until a current use in a control cycle by the first process meets a first setpoint of use for the first process when the first setpoint is at or below a latency sensitive (LS) floor or a current use in the control cycle by the first process exceeds the LS floor when the first setpoint exceeds the LS floor.

19 Claims, 10 Drawing Sheets

(56) References Cited

U.S. PATENT DOCUMENTS

| | | |
|---|---|---|
| 2014/0082630 A1* | 3/2014 | Ginzburg ............ G06F 15/7807 |
| | | 718/105 |
| 2014/0137130 A1 | 5/2014 | Jacob et al. |
| 2014/0344528 A1 | 11/2014 | Kini et al. |
| 2014/0372711 A1 | 12/2014 | O'Connor et al. |
| 2016/0253212 A1 | 9/2016 | Solihin |
| 2016/0253264 A1 | 9/2016 | Bose et al. |
| 2017/0228259 A1 | 8/2017 | Solihin |
| 2018/0035126 A1* | 2/2018 | Lee ...................... H04N 19/176 |
| 2018/0165209 A1* | 6/2018 | Poxon ................. G06F 12/0284 |
| 2018/0189232 A1* | 7/2018 | Pal ................... G06F 15/17381 |

OTHER PUBLICATIONS

International Search Report and Written Opinion dated Jan. 11, 2019 for PCT/US2018/051593, 7 pages.

* cited by examiner

701 LATENCY SENSITIVE (LS) FLOOR TABLE

| LS PROCESSES | RESOURCE #1 | | RESOURCE #2 | |
|---|---|---|---|---|
| | ACTUAL | SLO_1 | ACTUAL | SLO_2 |
| LS-PROCESS_1 | 0.1 | 2.0 | 1.1 | SLO_2_1 |
| LS-PROCESS_2 | 1.1 | 2.0 | 2.2 | SLO_2_2 |
| | 703 | 704 | 705 | 706 |
| LS TOTALS | 1.2 | 4.0 | LT_A_2 | SLO_T_2 |

702

711 NON-LATENCY SENSITIVE (NLS) SETPOINT TABLE

| NLS PROCESSES | RESOURCE #1 | | RESOURCE #2 | |
|---|---|---|---|---|
| | ACTUAL | SETPOINT | ACTUAL | SETPOINT |
| NLS-PROCESS_1 | 1.1 | 1.0 | 7.7 | STPT_2_1 |
| NLS-PROCESS_2 | 2.2 | 2.0 | 8.8 | STPT_2_2 |
| NLS-PROCESS_3 | 3.3 | 3.0 | 9.9 | STPT_2_3 |
| | 713 | 714 | 715 | 716 |
| NLS TOTALS | 6.6 | 6.0 | NT_A_2 | T_T_2 |

801 LATENCY SENSITIVE (LS) FLOOR TABLE

| LS PROCESSES | RESOURCE #1 | |
|---|---|---|
| | ACTUAL | SL_1_SETPOINT |
| LS-PROCESS_1 | 2.1 | 2.0 |
| LS-PROCESS_2 | 1.1 | 2.0 |
| | 803 | 804 |
| LS TOTALS | 3.2 | 4.0 |

802  806  805

811 NON-LATENCY SENSITIVE (NLS) SETPOINT TABLE

| NLS PROCESSES | RESOURCE #1 | | NLS_1_LIMIT |
|---|---|---|---|
| | ACTUAL | SETPOINT | |
| NLS-PROCESS_1 | 1.1 | 1.0 | (NONE) |
| NLS-PROCESS_2 | 2.2 | 2.0 | (NONE) |
| NLS-PROCESS_3 | 3.3 | 3.0 | (NONE) |
| | 813 | 814 | 815 |
| NLS TOTALS | 6.6 | 6.0 | |

| 901 | LATENCY SENSITIVE (LS) FLOOR TABLE | | | NON-LATENCY SENSITIVE (NLS) SETPOINT TABLE 911 | | | |
|---|---|---|---|---|---|---|---|
| | RESOURCE #1 | | | | RESOURCE #1 | | |
| LS PROCESSES | ACTUAL | SLO_1 | SL_1_SETPOINT | NLS PROCESSES | ACTUAL | SETPOINT | NLS_1_LIMIT |
| LS-PROCESS_1 | 1.8 | 2.0 | 2.0 | NLS-PROCESS_1 | 1.1 | 1.0 | NO |
| LS-PROCESS_2 | 1.8 | 2.0 | 2.0 | NLS-PROCESS_2 | 2.2 | 2.0 | NO |
| | | | | NLS-PROCESS_3 | 3.1 | 3.0 | YES |
| | 903 | 904 | 905 | 912 | 913 | 914 | 915 |
| LS TOTALS | 3.6 | 4.0 | | NLS TOTALS | 6.4 | 6.0 | |

| 1001 | LATENCY SENSITIVE (LS) FLOOR TABLE | | | NON-LATENCY SENSITIVE (NLS) SETPOINT TABLE 1011 | | | |
|---|---|---|---|---|---|---|---|
| | RESOURCE #1 | | | | RESOURCE #1 | | |
| LS PROCESSES | ACTUAL | SLO_1 | SL_1_SETPOINT | NLS PROCESSES | ACTUAL | SETPOINT | NLS_1_LIMIT |
| LS-PROCESS_1 | 2.0 | 2.0 | 2.0 | NLS-PROCESS_1 | 1.0 | 1.0 | YES |
| LS-PROCESS_2 | 1.8 | 2.0 | 2.0 | NLS-PROCESS_2 | 2.0 | 2.0 | YES |
| | | | | NLS-PROCESS_3 | 3.0 | 3.0 | YES |
| | 1003 | 1004 | 1005 | 1012 | 1013 | 1014 | 1015 |
| LS TOTALS | 3.8 | 4.0 | | NLS TOTALS | 6.0 | 6.0 | |

1002

1100

| 1101 | LATENCY SENSITIVE (LS) FLOOR TABLE | | | 1111 | NON-LATENCY SENSITIVE (NLS) SETPOINT TABLE | | | |
|---|---|---|---|---|---|---|---|---|
| | RESOURCE #1 | | | | | RESOURCE #1 | | |
| LS PROCESSES | ACTUAL | SLO_1 | SL_1 SETPOINT | | NLS PROCESSES | ACTUAL | SETPOINT | NLS_1_LIMIT |
| LS-PROCESS_1 | 2.0 | 2.0 | 2.0 | | NLS-PROCESS_1 | 0.8 | 0.8 | YES |
| LS-PROCESS_2 | 2.0 | 2.0 | 2.0 | | NLS-PROCESS_2 | 1.6 | 1.6 | YES |
| _1102_ | _1103_ | _1104_ | _1105_ | | NLS-PROCESS_3 | 2.6 | 2.6 | YES |
| LS TOTALS | 4.0 | 4.0 | 4.0 | | _1112_ | _1113_ | _1114_ | _1115_ |
| | | | | | NLS TOTALS | 5.0 | 5.0 | |

SCHEDULING MEMORY BANDWIDTH BASED ON QUALITY OF SERVICE FLOOR

BACKGROUND

In a processing system such as a computer server, a processor often must service tasks from different processes executing concurrently, where the different processes are associated with different users, clients, and devices. The concurrent processes compete for processing resources. While processors and processing systems can be over-built to ensure that certain resources are always available, this approach is expensive and can result in resources that sit idle for much of their life and are wasted. In some systems, to manage assignment of resources to different processes, an operating system implements a priority scheme whereby each process is assigned a priority and the operating system assigns resources to each process according to its priority. However, conventional priority schemes can result in over-allocation of resources to high priority processes, especially when those processes are idle with respect to some resources and not others. In periods of low activity by high priority processes, a processing system constrained by rigid rules wastes substantial computing capacity that otherwise could be put to use by low priority processes.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIGS. 7-11 are tables illustrating latency sensitive (LS) floors and non-latency sensitive (NLS) limits at various times in a system in accordance with some embodiments.

FIG. 12 is a graph illustrating consumption of a resource and a process latency over time for a computing system in accordance with some embodiments.

DETAILED DESCRIPTION

Figure 1:
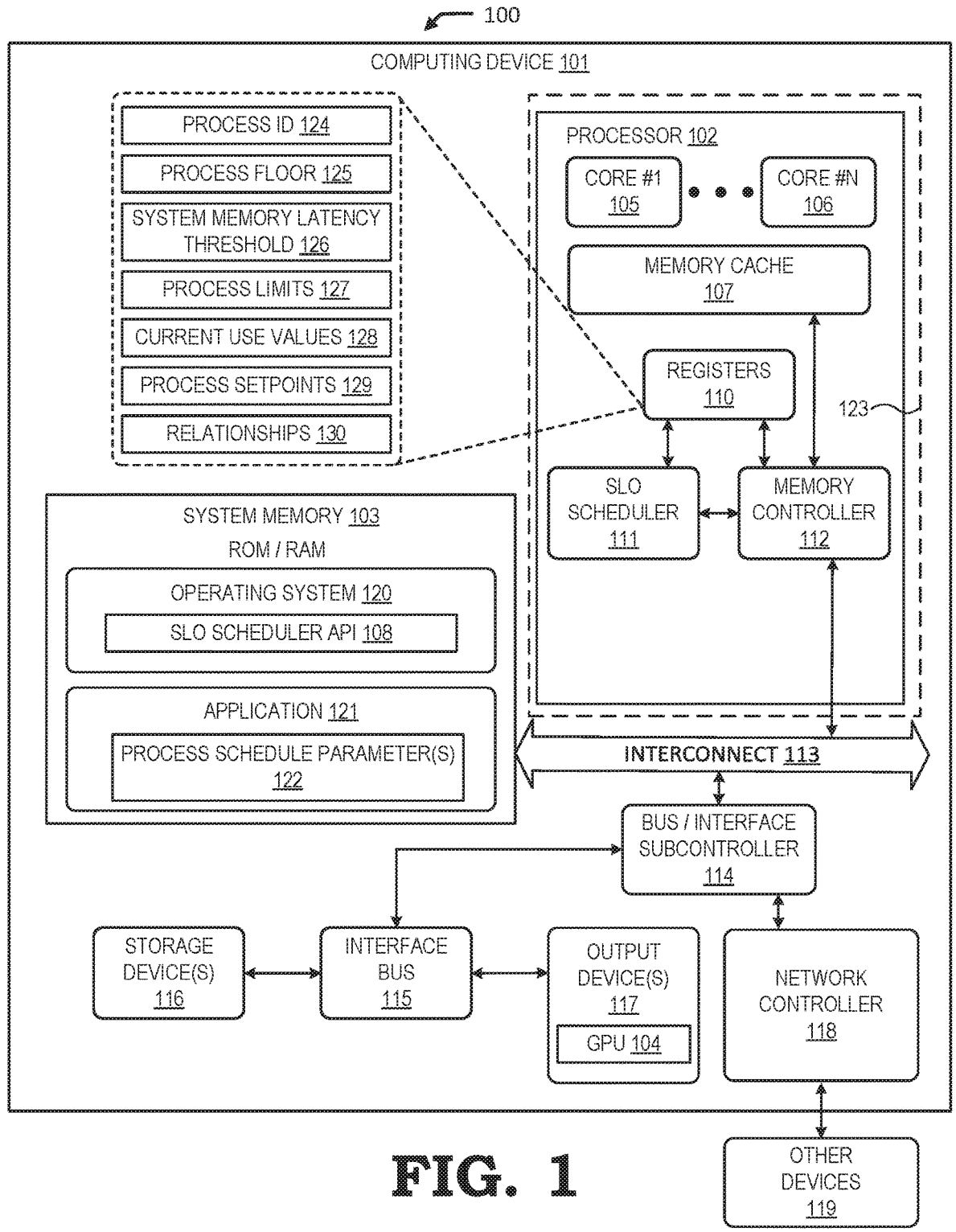
FIG. 1 is a block diagram illustrating a computing system having multiple processing cores and a scheduler to meet service level objectives (SLOs) in accordance with some embodiments.

Generally, FIGS. 1-13 illustrate techniques for assigning resources to concurrently executing processes at a processing system, whereby each process is assigned at least a minimum floor of accessibility to various limited, shared computing system resources. Such limited resources (LRs) include at least one of CPU availability as measured in a number of counts or cycles, a memory availability (e.g., L3 memory cache availability), a memory bandwidth availability, a network resource availability, an inbound network bandwidth use, an outbound network bandwidth use, and the like. The computing system manages the limited resources to ensure that latency sensitive (LS) processes and non-latency sensitive (NLS) processes meet service level objectives (SLOs) while concurrently maximizing use of the available LRs. While SLOs include mandatory objectives and aspirational objectives, for convenience, the mandatory objectives are referred to herein as objectives or SLOs, and the aspirational SLOs are referred to as setpoints. A processing system also has certain properties or characteristics that can be measured, and, to some extent, controlled but not allocated among processes. Examples of such properties include memory latency and overall process latency. These properties may also be a SLO, an aspirational target, or a setpoint in a control scheme as further described herein.

As a specific example, the techniques described herein control memory bandwidth use by NLS processes. This leads to an acceptable system memory latency, which leads to each LS process achieving a respective desired memory bandwidth floor when the LS processes demand at least their respective memory bandwidth floors. In short, a system controls one variable (NLS memory bandwidth use) in order to affect a second variable (system memory latency which affects all processes) to achieve the goal of having LS processes get their respective SLO memory bandwidth use.

If a system memory latency is too high, it is not possible to tell whether the LS process would consume its memory bandwidth allocation (LR floor) if the latency were lower. That is, there is no way in the hardware system to determine whether the LS process is "requesting" more memory bandwidth use than it is getting. So, the system manages the NLS processes by use of setpoints to apply limits, caps, or throttling as described herein to bring the total system memory bandwidth down as needed. If the memory latency is brought down to the point that the LS processes are able to consume their bandwidth allocations, without necessarily bringing the latency all the way down to a "contract" latency, then the NLS processes are not throttled any further, thereby getting more useful work out of the system than previously possible under previous schemes.

If the system throttles back the NLS processes until the system achieves the contracted latency, which is not a minimum memory latency possible, that is as far as the system throttles the NLS processes. That is, the system guarantees that the system will deliver the LR floor memory bandwidth use or a nominal latency (the contracted latency) and the system is thereby optimized so that the system does not overly penalize the NLS processes by completely stopping operation of the NLS processes in an effort to get to a bare minimum latency to try to get more memory bandwidth to the LS processes. The system allows the NLS processes to use more memory bandwidth and drive the system latency above the contract latency as long as the latency does not go so high that the LS processes fail to meet their LR floor. According to some embodiments, success in such a system is managing the NLS memory bandwidth use so that either the contract system latency is achieved, or the bandwidth floor is met for the LS processes at substantially all times. In other embodiments, both of these conditions are met at substantially all times.

FIG. 1 is a block diagram illustrating a processing system 100 having multiple processing cores and a scheduler to meet SLOs of a limited resource (e.g., memory bandwidth usage) in accordance with some embodiments. For sake of simplicity, a single limited resource is described. The same or similar techniques as described herein can be implemented to concurrently meet a plurality of SLOs corresponding to a plurality of limited resources in a computing system for each process so that multiple limited resources are utilized more fully by all processes operative in the system. In some embodiments, the processing system 100 is incorporated into any number of electronic devices, including a server, a desktop or laptop computer, a smartphone, a tablet, a gaming console, and the like. The processing system 100 includes a computing device 101 that includes a system memory 103 and a multi-core processor 102 and settings for the same as further described herein.

The system memory 103 uses one or more of read-only memory (ROM) and random access memory (RAM). The system memory 103 stores an operating system (OS) 120. According to some embodiments, the OS 120 makes available a SLO scheduler API 108 for configuring the components further described herein. The OS 120 manages the execution of applications such as application 121 in the system memory 103. Some of the applications 121, and thereby at least some of the processes operative in the processor 102, are associated with the application 121. The processes operative in the processor 102 are designated as either latency sensitive (LS) or non-latency sensitive (NLS). NLS processes are also known as processes that can be executed in a "best effort" scheme to meet an aspirational target of use of the LR. Success of meeting the target may be measured in units of time, units of control cycles, amount of cumulative time without a violation, and so forth.

Latency as described herein is in reference to LS and NLS processes unless otherwise indicated. An example of an LR that is related to a type of latency is memory latency which, according to some embodiments, refers to a time it takes for a memory system to respond to a processor (e.g., the processor 102, a CPU or a GPU) requesting to read some data. In many computing systems, memory latency is at least partially correlated with memory bandwidth use. For example, a higher bandwidth use corresponds to a somewhat higher memory latency. The correlation may be strong or weak depending on other conditions in a particular computing system such as processing system 100. According to some embodiments, an increase in aggregate memory bandwidth demand results in an increase in system latency. However, a given individual process typically consumes more bandwidth if the system latency is lower at a particular time. That is, for the process, bandwidth consumed is, to some extent, a function of system latency, but the way a system such as processing system 100 behaves, the latency is, to some extent, a function of the bandwidth demand.

According to some embodiments, each application 121 includes or has associated therewith one or more process schedule parameters 122 for use with the LS or NLS designation. The process schedule parameters 122 configure the computing device 101 to operate LS tasks, LS jobs, LS processes, and LS threads differently from NLS tasks, NLS jobs, NLS processes, and NLS threads as further described below.

The processor 102 includes, but is not limited to, a microprocessor, a microcontroller, a digital signal processor (DSP), or any combination thereof. According to some embodiments, the processor 102 includes multiple cores such as a first core 105 through an Nth core 106 that represents a last of N number of cores in the computing device 101. In a multi-core processor, multiple processor cores or "cores" may be included in a single integrated circuit die 123 or on multiple integrated circuit dies in the computing device 101. The multiple circuit dies may be arranged in a single chip package. The processor 102 has two or more cores 105, 106 interfaced for enhanced performance and efficient processing of multiple tasks and threads of processes operative in the computing device 101. According to some embodiments, threads of processes are assigned by the OS 120 for execution to one or more cores in multi-core processors based on latency, cache use, load balancing, and so forth. According to some embodiments, the processor 102 includes a cache hierarchy that includes, for example, a level 1 cache, a level 2 cache, and a level 3 cache, which is represented by the memory cache 107 in FIG. 1. The processor 102 also includes a set of registers 110, a SLO scheduler 111, and a memory controller 112.

The memory controller 112 couples and coordinates operation of the various components of the processor 102 with other components through an interconnect 113 such as a memory bus. The memory controller 112 communicates and coordinates its operation with the SLO scheduler 111 to enable operation of one or more processes of one more applications such as the first application 121. Processes in the form of threads are active in the processor 102. According to some embodiments, the SLO scheduler 111 and the memory controller 112 have their own memory registers in which to count steps and executions of the cores 105, 106 and other components of the processor 102 when executing processes. In other embodiments, the SLO scheduler 111 and the memory controller 112 access certain memory registers 110 designated in the processor 102 for their respective operations (steps and executions of the cores 105, 106 and other components) of the processor 102. The one or more process schedule parameters 122 provide an LR floor 125 of the LR for an application designated as an LS application or any process of the application designated as an LS process. According to some embodiments, the LS designation is provided based on a process ID 124 of a process spawned for the application 121 when the application 121 is launched in the OS 120. The process schedule parameters 122 are provided to the registers 110 for use by the SLO scheduler 111.

According to some embodiments, the processing system 100 is configured with at least one LR floor 125 for at least one LS process, a system memory latency threshold 126, and may include one or more process limits 127 or maximum on a corresponding resource for at least one process. The LR floor 125 may be provided on an individual process basis, or the LR floor 125 may be shared for some or all LS processes designated to participate with the LR floor 125. These elements are included in either the registers 110 or the SLO scheduler 111. The process limits 127 are either an LS limit (which is an LR limit associated with an LS process) or an NLS limit (which is an LR limit associated with an NLS process). According to other embodiments, the SLO scheduler 111 is provided with an allocation of an LR for each process which includes both a floor on the use of that LR by each LS process and/or a limit on the use of that LR by each LS or NLS process participating in the SLO scheduler 111. According to some embodiments, a setpoint may be provided for a process. As used herein, and according to some embodiments, a setpoint is a current allocation of a resource which is set dynamically in order to try to control some other system attribute. For example, a current setpoint is provided for a process corresponding to a target value for memory bandwidth use for that particular process where the process has been chosen by the SLO scheduler for adjustment in an effort to meet a particular SLO (e.g., system latency, bandwidth available to the LS process). A setpoint is thereby a target amount for the process to consume in a particular control cycle.

The SLO scheduler 111 interoperates with the memory controller 112 to create and implement a control scheme for the processor 102. The registers 110 include registers for one or more current use values 128 such as current use of a LR by LS processes and NLS processes, one or more process setpoints 129, and one or more relationships 130. The one or more relationships 130 take various forms. In some embodiments, the relationships 130 are simple such as a pointer or direct correspondence between one variable and another variable. In other embodiments, the relationships are complex and take the form of a linear process control model and a non-linear process control model between at least one LS process, at least one NLR process, and at least one limited resource in the computing system. By way of example, the LR is memory bandwidth usage. According to some embodiments, the one or more relationships 130 include a relationship between the system latency threshold 126, the one or more (LS) floors 125, and the one or more (NLS) process limits 127.

When the processor 102 is in operation, the SLO scheduler 111 operates to ensure that each LS designated process is provided at least its floor 125 of an available amount of the LR for each processing time unit or control cycle. In the computing device 101, the interconnect 113 communicates with the system memory 103 and at least one bus/interface subcontroller 114. When the computing device 101 is in operation, the bus/interface subcontroller 114 communicates with a network controller 118 and one or more interface busses 115 to interact with various components as needed.

The interface bus 115 communicates with one more storage devices 116 such as a solid-state drive (SSD), conventional hard drive (HD), or other persistent storage device such as an optical media device. During startup or a boot process, the OS 120 is loaded from the storage device 116 into the system memory 103. According to some embodiments, a startup state and an initial configuration of the SLO scheduler 111 is provided by a boot loader of the OS 120. Subsequently, as each LS application is launched by the OS 120, the SLO scheduler 111 is operated to provide at least the floor 125 of the LR to the LS application.

The interface bus 115 also communicates with one or more output devices 117 such as a graphics processing unit (GPU) 104. According to some embodiments, the GPU 104 has its own memory registers, caches, SLO scheduler, and memory controller, and the GPU 104 is configured in a similar manner as the processor 102 to operate with its own SLO scheduler to control processes and threads operative in the GPU 104. Unless specifically indicated otherwise, the GPU 104 and its own SLO scheduler are configured in a similar manner as the processor 102 and its SLO scheduler 111. The network controller 118 facilitates communication and interoperability between the computing device 101 and other devices 119 such as devices coupled to the computing device 101 across a network (not illustrated).

Figure 2:
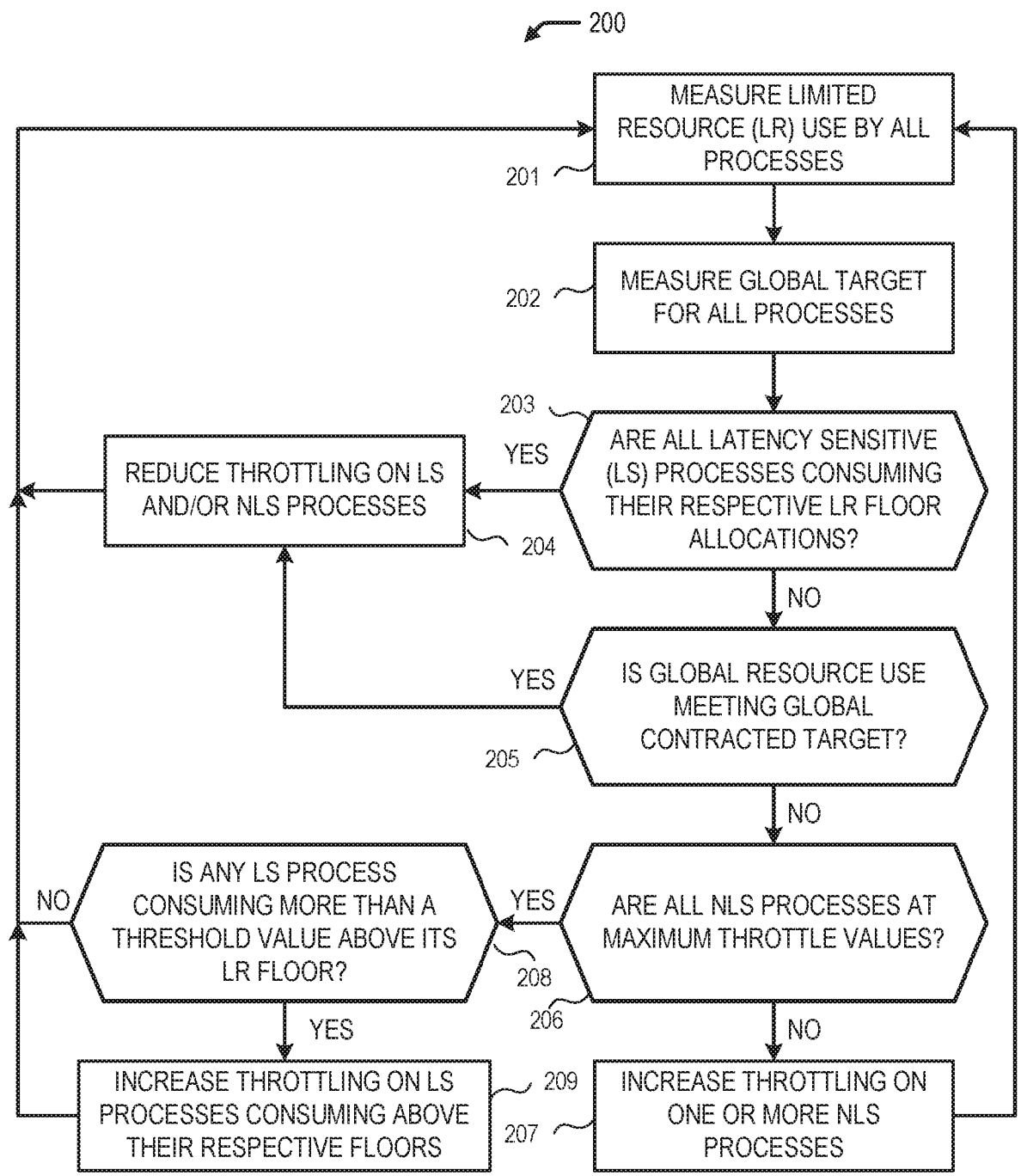
FIGS. 2-6 are flow diagrams illustrating methods for operating a computing system in accordance with some embodiments.

FIG. 2 is a flow diagram illustrating a method for operating a system having a SLO scheduler in accordance with some embodiments. The method 200 is operative in a system or a device such as the device 101 of FIG. 1 (1) to manage a LR, to increase overall consumption of the LR, especially when LS processes are relatively idle compared to NLS processes, and (2) to meet a global target for all processes of the system where the global target is dependent on or a function of the LR. By way of example, the LR is memory bandwidth use and the global target is memory latency by all processes.

At block 201, use of the LR by all processes operative in a processor of the device is measured. At block 202, the global target is measured for all processes. At block 203, it is determined whether all LS processes are consuming their respective LR floor allocations. For example, a counted value for each LS process is compared against a static designated LR floor value. If all of the LS processes are currently consuming their respective LR floors, at block 204 any throttling being applied to LS processes and/or NLS processes is reduced so that the LS processes and/or the NLS processes can consume more of the LR in a subsequent control cycle. At block 205, it is determined whether a global resource use is meeting a global contracted target. In some embodiments, this determination at block 205 includes comparing a counted or accumulated value against a static designated contracted target value for the particular global resource. As an example, if a memory latency (ML) for all processes is below a maximum contracted ML, no violation of the contracted ML is evident at the particular control cycle. If LS processes are consuming below their respective LR floors, the system is stable because the LS processes are not aggressively consuming the LR and the LS processes are not memory bandwidth limited, and the method 200 continues to evaluate the global target.

At block 206, it is determined whether all NLS processes are subject to a respective maximum throttling value. If not, the SLO scheduler takes further action such as to increase throttling on one or more NLS processes at block 207 since there still is some control freedom in the NLS processes. If all NLS processes have been maximally throttled at block 206, at block 208 the SLO scheduler determines whether there is any LS process consuming more than a threshold value above its LR floor. If so, at block 209 the SLO scheduler increases throttling on any one or more of those LS processes that are consuming a substantial amount of the LR above their respective guaranteed floors. The method 200 is one embodiment of a system that throttles LS processes and NLS processes to meet a global contracted target, to guarantee that LS processes are consuming at least their floors of the LR, and to allow NLS processes to consume as much of the LR that is left over.

Figure 3:
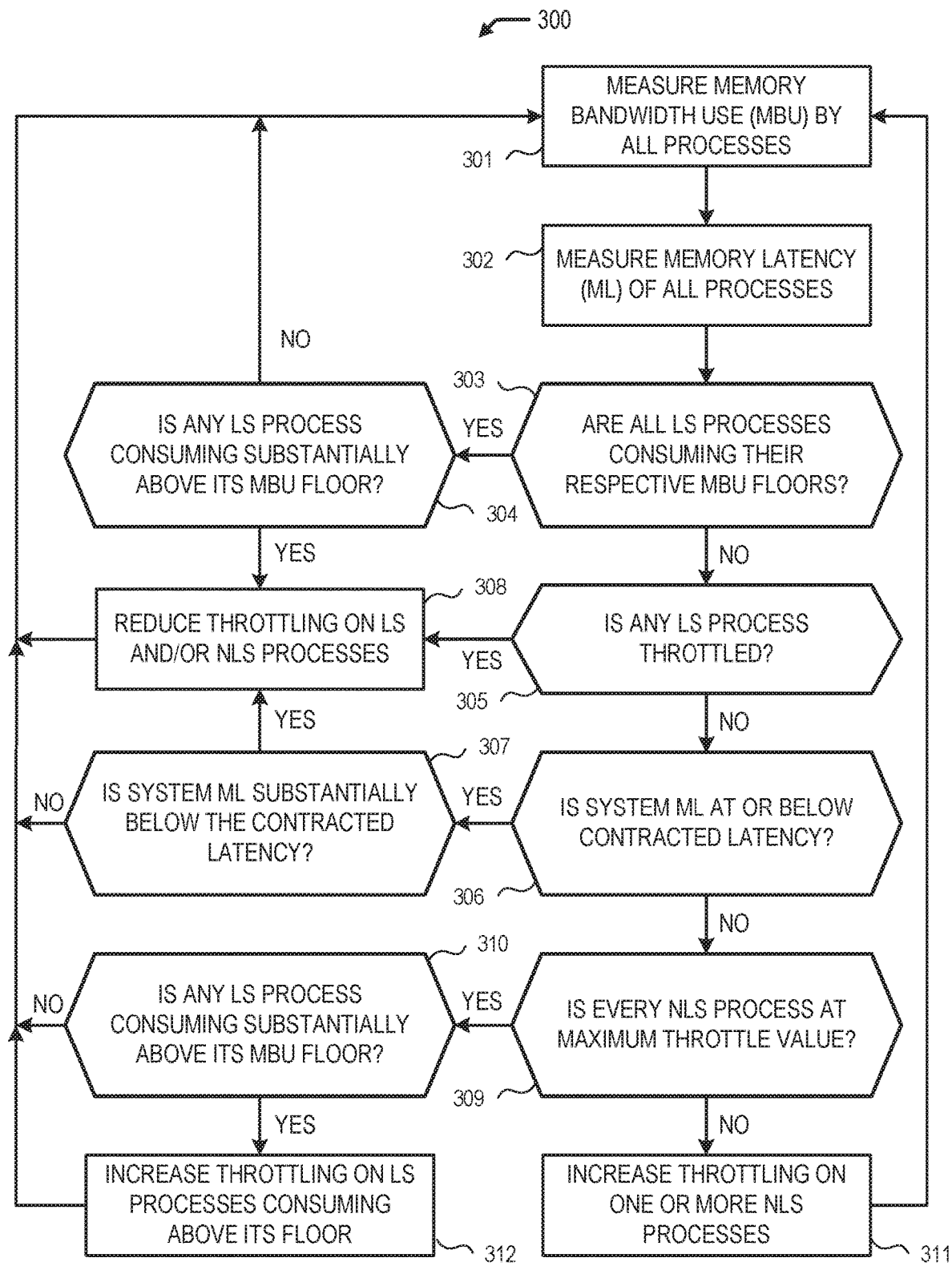

FIG. 3 is a flow diagram illustrating a method for operating a system having a SLO scheduler in accordance with some embodiments. In FIG. 3, the method 300 includes measuring memory bandwidth use (MBU) by all processes at block 301. At block 302, memory latency (ML) is measured for all processes. At block 303, it is determined whether all LS processes are consuming their respective MBU floors. If so, it indicates that one or more of the LS processes are consuming substantial amounts of memory bandwidth. At block 304, it is determined whether any of the LS processes is consuming a substantial amount above its MBU floor. A substantial amount as used herein refers to one of a variety of meanings. For example, in some embodiments a substantial amount is determined by evaluating whether a current value is above a threshold value beyond a respective MBU floor. If not (at block 304), no further action is taken in the control cycle because the LS processes are not memory bandwidth limited. If any of the LS processes is consuming a substantial amount above its MBU floor at block 304, at block 308 the SLO scheduler reduces throttling on certain LS processes and/or NLS processes as known to those in the art. For example, one or more of the LS processes consuming the substantial amount above its MBU floor is throttled back toward its MBU floor so as to more equitably share memory bandwidth use in the subsequent control cycle.

At block 303, if none of the LS processes are consuming their respective MBU floors ("no" leaving block 303), the LS processes are not abundantly active with respect to MBU. At block 305, the system determines whether any LS process is throttled. If so, the system at 308 reduces or eliminates throttling on the throttled LDS processes. At block 306, the system determines whether the system ML is at or below a contracted latency. The system ML is an example of a global target. If so, at block 307 the system determines whether the system ML is substantially below the contracted latency. If so, the system has ML available for consumption, and at block 308, the system reduces throttling on LS processes and/or NLS processes to take advantage of the low system ML. If the system ML is not at or below the contracted latency, starting at block 309 the system takes further steps.

At block 309, the system determines whether every NLS process is at a maximum throttle value (maximally throttled). If not, at block 311, the SLO scheduler increases throttling on one or more NLS processes that are not already maximally throttled. If no NLS process is available to throttle, at block 310, the system determines whether any LS process is consuming substantially above its MBU floor. If so, any such LS process is a good candidate for throttling. At block 312, the SLO scheduler increases throttling on one or more LS processes that are consuming above its respective MBU floor. If all of the LS processes at block 310 are at or below their MBU floors, no further throttling is available because the SLO scheduler is configured to allow the LS processes to consume at or below their respective MBU floors.

Figure 4:
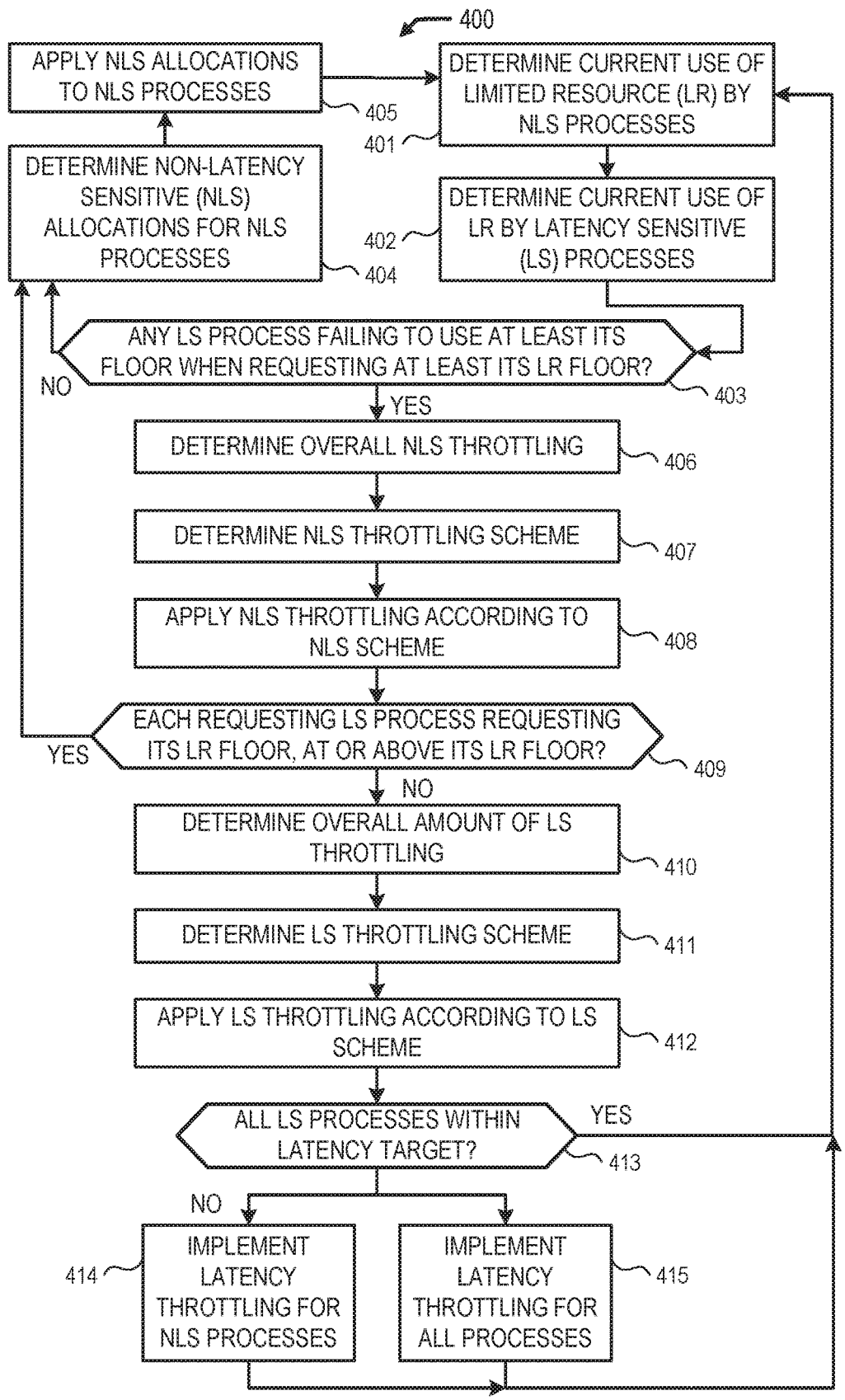

FIG. 4 is a flow diagram illustrating a method for operating a system having a SLO scheduler in accordance with some embodiments. The method 400 is operative in a system or a device such as the device 101 of FIG. 1 to manage, by the SLO scheduler, a limited resource (LR) during each unit of time or control cycle of the processor. As a specific example, in FIG. 4, the LR is memory bandwidth usage (MBU). In some embodiments, a control cycle is a certain number of program counter cycles or a certain number execution steps of instructions executing on the CPU, or a certain amount of time allocated for a control cycle. The control cycle includes throttling that is applied to one or more processes, and to one or multiple threads of a single process as needed in order to meet a control objective by application of NLS throttling for NLS-designated processes and their respective threads, and LS throttling for LS-designated processes and their respective threads. The method 400 is operative to first manage a use of the LR, and second to manage a latency associated with the LS and NLS processes operative in the processor. The method 400 controls use in a current control cycle or in a future control cycle. While a single LR is referenced with respect to FIG. 4, as understood by those in the art, multiple LRs are manageable by the SLO scheduler.

At block 401, the SLO scheduler such as the SLO scheduler 111 of FIG. 1 determines a current use of the LR by each of the NLS processes. At block 402 of FIG. 4, the SLO scheduler determines a current use of the LR by each of the LS processes. In some embodiments, the current use by a particular process is an aggregate use of the LR by threads of one or more particular processes operative across all cores of the processor. In other embodiments, the use of the LR is for a single core of a particular process, and the LR is in relation to the single core where the LS process is operative on the single core. In some embodiments, determining a current use includes accessing a value in a register that has been counted over a timeframe (control cycle) where the value is related to a current use of the LR by processes operative in a processor such as in processor 102 of FIG. 1. In other embodiments, determining a current use includes measuring a value over time such as multiple clock cycles, program counter cycles, or control cycles. According to some embodiments, the current use for a particular time cycle is available in a register available to the SLO scheduler 111 such as one of the registers 110 of the processor 102 of FIG. 1.

At block 403 of FIG. 4, the SLO scheduler determines whether the current use by each LS process is requesting at least its LR floor from the system and not actually using at least its floor. If no LS process is failing the determination at block 403, further steps involving NLS processes are performed at blocks 404 and 405. At block 404, the SLO scheduler determines NLS allocations for NLS processes. At block 405, the SLO scheduler applies NLS allocations to the respective NLS processes. According to one scenario, one set of allocations involves removing NLS-specific restrictions on the respective NLS processes. In another scenario, as further described below, NLS allocations are determined based on other factors including those related to LS processes, current consumption and demands of the LR, and a current state of the processor.

At block 406, when one or more LS processes are requesting at least their respective LR floors of the LR, the SLO scheduler determines an overall NLS throttling. The NLS throttling includes an overall value of the LR (memory bandwidth usage) that must be shared across NLS processes. At block 407, using the overall NLS throttling, the SLO scheduler determines an NLS throttling scheme for the NLS processes. According to some embodiments, the NLS throttling scheme includes setting a limit for a use of the LR by each of the NLS processes. The NLS throttling scheme includes a NLS throttling value that is a use count or use value that is counted each control cycle or across a plurality of control cycles. According to some embodiments, the throttle scheme includes limiting how many transactions each NLS process is allowed to have in flight at one time on the processor. According to other embodiments, the particular NLS throttling scheme is related to one or more factors related to currently operative LS processes, currently operative NLS processes, current consumption and demands of the LR, and a current state of the processor. In general, the NLS throttling scheme includes one or more of: maximizing throughput (a total amount of work completed per time unit), minimizing a response time (a time from work becoming enabled until the first point a process, job, or thread begins execution on a resource), minimizing a latency (a time between work becoming enabled and its subsequent completion), and maximizing fairness (providing an equal amount of processor time to each process, or another relative amount of time generally appropriate according to a priority and a workload of each process). In practice, these goals often conflict (e.g. throughput versus latency), thus the SLO scheduler implements a suitable compromise. At block 408, the SLO scheduler applies the determined NLS throttling scheme. In some embodiments, application of the NLS throttling scheme is in a current control time cycle or in a proximate (next) control time cycle.

At block 409, the SLO scheduler determines whether each requesting LS process is consuming the LR at or above its LR floor. If so, the SLO scheduler performs the functions previously described at blocks 404 and 405 taking into account that at least one LS process is requesting at least its LR floor. If not, at block 410, the SLO scheduler determines an overall amount of LS throttling to apply to the LS processes operative on the processor. At block 411, the SLO scheduler determines an LS throttling scheme. According to some embodiments, the LS throttling scheme includes setting a limit for a use of the LR by each of the LS processes. According to one example scheme, at block 411, an LS throttling scheme balances consumption of the memory bandwidth usage across currently operative LS processes such that all LS processes consume at least a respective LR floor instead of having one or more LS processes fail to consume at least its respective LR floor of the LR at the expense of other LS processes consuming well above their respective LR floors. According to another example scheme, an LS throttling scheme lowers consumption by each of the LS processes an equal percentage for at least one control cycle of the SLO scheduler. At block 412, the SLO scheduler applies the LS throttling scheme to currently operative LS processes.

At block 413, after applying the throttling scheme to control consumption of the LR, the SLO scheduler determines whether all LS processes are operating within their respective time latency targets as a second controlled variable. If not, at block 414, the SLO scheduler implements a throttling for NLS processes. For example, at block 414, only NLS processes are affected by the latency throttling. At block 414, LS processes are not throttled so as to provide an opportunity for the LS processes to attain the latency target for the system within one, two, three, or other designated number of control cycles at the SLO scheduler. Alternatively, if all LS processes are not operating within a latency target, or their respective latency targets while operative on the system, at block 415, the SLO scheduler implements a latency throttling for all processes. For example, at block 415, all processes operative on the processor share a same reduction when one or more of the LS processes operative on the processor are not operative within the latency target, or their respective latency targets. According to at least one embodiment, each process, including each LS process and each NLS process, may have its own latency target. According to other embodiments, the processor and its NLS processes and LS processes are provided with a global processor latency target. According to other embodiments, only one or more LS processes have latency targets, and other processes operative on the processor are not provided with their own individual or system-wide process target.

Figure 5:
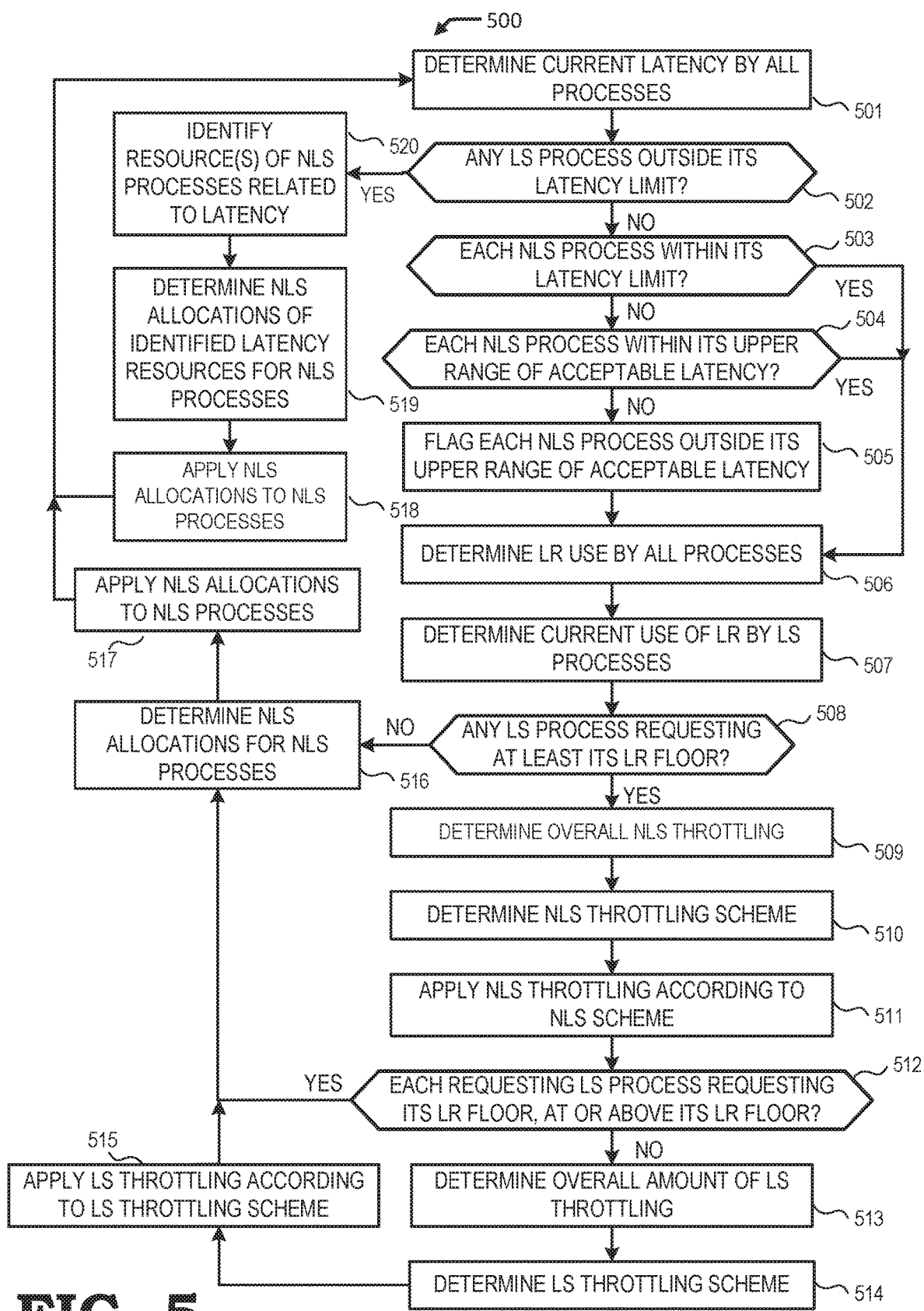

FIG. 5 is a flow diagram illustrating a method for operating a system in accordance with some embodiments. The method 500 is operative in a system or a device such as device 101 of FIG. 1 to manage the LR (e.g., memory bandwidth usage). The method 500 is operative to first manage a latency associated with the LS processes and NLS processes operative on the processor, and second to manage a use of the LR.

At block 501, the SLO scheduler determines a current latency by all processes operating on the processor. At block 502, the SLO scheduler determines whether any LS process is outside its latency limit. According to some embodiments, the latency limit is a same latency limit for all processes. Alternatively, according to other embodiments, each LS process has its own individual latency limit or shares a latency limit for all LS processes with a separate latency limit for all NLS processes. If any LS process is outside the latency limit, at blocks 520, 519, and 518, further processing occurs. At block 520, the SLO scheduler identifies one or more resources of NLS processes that are related to latency. At block 519, the SLO scheduler determines one or more NLS allocations of the identified latency resources for the NLS processes. At block 518, the SLO scheduler applies the previously determined NLS allocations to the NLS processes. After block 518, subsequent SLO control cycles are performed.

Once all LS processes are within the latency limit at block 503 (no LS process is outside its latency limit), at block 503, the SLO scheduler determines whether each NLS process is within its latency limit. If so, further processing occurs. If not, at block 504, the SLO scheduler determines whether each NLS process is within an upper range of an acceptable latency for the processor and the system. According to some embodiments, there is a separate NLS upper limit for each respective NLS process operative on the processor. If each NLS process is within an upper range of an acceptable latency, further processing occurs. If not, at block 505, the SLO scheduler flags each NLS process as being outside its upper range of acceptable latency. After block 505, subsequent processing involves LR use by the processes operative on the processor.

At block 506, the SLO scheduler determines a current LR use by all processes. At block 507, the SLO scheduler determines a current LR use by the LS processes such as by determining a current LR use by each of the LS processes. With respect to FIG. 5, in some embodiments, the current use by a particular process is an aggregate use of the LR by threads of the particular process operative across all cores of the processor. In other embodiments, the use is for a single core, and the LR is for the single core. In some embodiments, determining a current use includes accessing a value in a register that has been counted over a timeframe or a control cycle, the value related to a current use of the LR by processes operative in a processor such as in processor 102 of FIG. 1. In other embodiments, determining a current use for a process includes measuring a value over time for the particular process.

At block 508, the SLO scheduler determines whether the current use by any LS process is requesting from the system at least its LR floor. If no LS process operative on the processor is requesting its LR floor, further steps involving NLS processes are performed. At block 516, the SLO scheduler determines NLS allocations for NLS processes. At block 517, the SLO scheduler applies NLS allocations to the respective NLS processes. According to one scenario, one set of allocations involves removing NLS-specific restrictions on the respective NLS processes. In another scenario, as further described below, NLS allocations are determined based on other factors including those related to LS processes, current consumption and demands of the LR, and a current state of the processor. Subsequent to block 517, further control cycles by the SLO scheduler are performed.

At block 508, when the SLO scheduler determines that one or more LS process is requesting at least its LR floor, at block 509, the SLO scheduler determines an overall NLS throttling. The NLS throttling includes an overall value that must be shared across NLS processes. At block 510, using the overall NLS throttling, the SLO scheduler determines an NLS throttling scheme. The particular NLS throttling scheme is related to one or more factors related to currently operative LS processes, currently operative NLS processes, current consumption and demands of the LR, and a current state of the processor. At block 511, the SLO scheduler applies the determined NLS throttling scheme.

At block 512, the SLO scheduler determines whether each requesting LS process is consuming the LR at or above its LR floor. If so, the SLO scheduler performs the functions previously described at blocks 516 and 517. If not, at block 513, the SLO scheduler determines an overall amount of LS throttling to apply to the LS processes operative on the processor. At block 514, the SLO scheduler determines an LS throttling scheme. According to one example LS throttling scheme, at block 514, consumption of the LR is balanced across currently operative LS processes instead of having one or more LS processes fail to consume at least its LR floor for the LR. According to another example scheme, an LS throttling scheme lowers all consumption of LS processes an equal percentage for at least one control cycle of the SLO scheduler. At block 515, the SLO scheduler applies the LS throttling scheme to currently operative LS processes.

Figure 6:
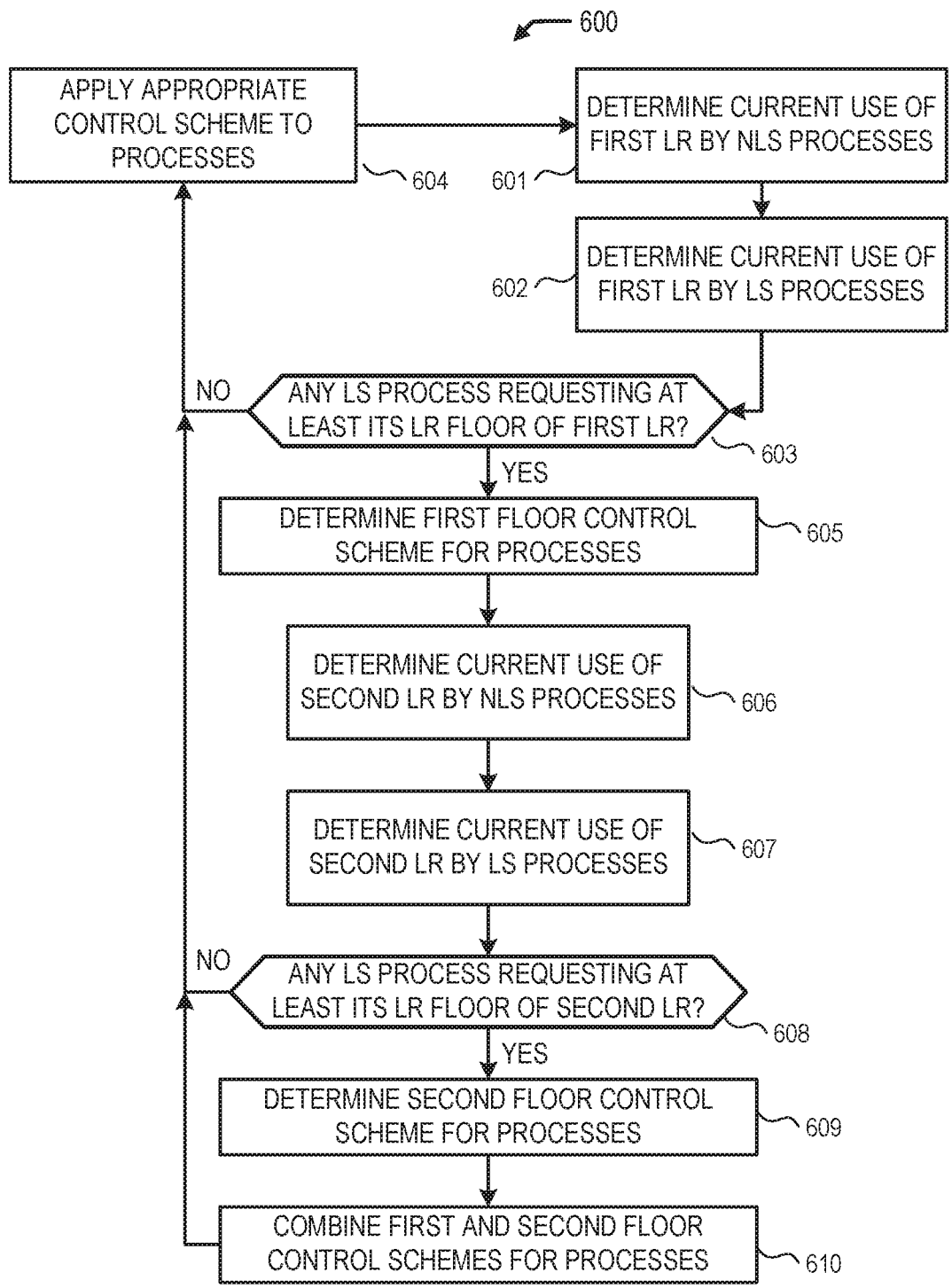

FIG. 6 is a flow diagram illustrating a method for operating a system in accordance with some embodiments. The method 600 includes control of a first LR and a second LR. According to some embodiments, a control scheme controls process latency in place of the first LR as a process-specific constraint or target and controls a maximum capacity of a system or a device as the second LR. For example, the system subject to the method 600 is the processing system 100 of FIG. 1. According to other embodiments, the first LR is a first maximum capacity of a system or a device such as processing system 100 of FIG. 1, and the second LR is a second maximum capacity of a system or a device such as processing system 100 of FIG. 1.

At block 601, a SLO scheduler determines a current use of the first LR by NLS processes operative on a processor of the system or the device. At block 602, a SLO scheduler determines a current use of the first LR by LS processes operative on the processor of the system or the device. At block 603, the SLO scheduler determines whether any LS process is requesting at least its LR floor of the first LR. If not, at block 604, an appropriate control scheme is applied by the SLO scheduler. If so, at block 605, the SLO scheduler determines a first control scheme for the processes based on the current use of the first LR by the NLS processes and the LS processes. Continuing at block 606, the SLO scheduler determines a current use of the second LR by the NLS processes operative on the processor of the system or the device. At block 607, the SLO scheduler determines a current use of the second LR by LS processes operative on the processor of the system or the device. At block 608, the SLO scheduler determines whether any LS process is requesting at least its LR floor of the second LR. If not, at block 604, an appropriate control scheme is applied by the SLO scheduler. If so, at block 609, the SLO scheduler determines a second control scheme for the processes based on the current use of the second LR by the NLS processes and the LS processes. At block 610, the SLO scheduler combines the first and second floor control schemes for the processes operative on the processor. The SLO scheduler operates the sequence of actions in FIG. 6 as long as LS processes and NLS processes are operative on a processor.

FIGS. 7-11 are tables illustrating latency sensitive floors and non-latency sensitive setpoints of a system at various times in accordance with some embodiments. For example, a system is the processing system 100 of FIG. 1. In some embodiments, one of the tables of FIGS. 7-11 or memory structures similar thereto is directly created as a set of configurable registers 110 in a processor die such as the processor die 123 of FIG. 1. The values of the registers change over time as process variables are determined and updated. While tables are described and illustrated in FIGS. 7-11, other types of computing and memory structures are usable with the techniques described herein as would easily be understood by those of ordinary skill in the art. For example, other computing and memory structures include one or more arrays, one or more registers such as registers 110 in FIG. 1, and one or more buffers operative in the caches 107 in FIG. 1.

For FIGS. 7-11, while any number of resources and any number of related SLOs for the LS processes are tracked and incorporated into a control scheme and shown in the tables, and implemented by a SLO scheduler, for sake of simplicity, only activity and consumption of a first resource (e.g., memory bandwidth usage) and a process latency are described with reference to the tables in FIGS. 7-11. According to some embodiments, the process latency is an overall current system process latency, an LS process latency of LS processes, or an NLS process latency of NLS processes. According to some embodiments, LS process latency is a SLO, while the NLS process latency is a target that may or may not require the control scheme to bring this control variable within a process latency threshold.

Further, the activity, values, and variables shown in FIGS. 7-11 are briefly described below in reference to one table having a set of values and variables that change over time moving from one table to another across FIGS. 7-11, where each of the figures represents one time-point or a snapshot along a timeline for an actively processing system. Relationships among the values and variables of FIGS. 7-11 are readily understood in relationship to the graph illustrated in FIG. 12. For sake of simplicity, a system latency for processes is not illustrated in FIGS. 7-11, but is shown in FIG. 12 and described in relation thereto.

FIG. 7 is a table 700 illustrating the floors and the setpoints of a system at a first time along the timeline for an actively processing system. Latency sensitive (LS) floors are shown in a first portion 701 of the table 700. The first portion 701 includes LS processes 702, a first actual resource use 703 for each LS process of a first resource (e.g., memory bandwidth usage), a first SLO 704 for each LS process for the first resource, a second actual resource use 705 for each LS process of a second resource, and a second SLO 706 for each LS process for the second resource. The first actual resource use 703 and the second actual resource use 705 are functions of time and thus the values illustrated in FIG. 7 change rapidly and variably over time as the LS processes 702 execute on the processor. Similarly, the SLOs 704, 706 are changeable over time such as by way of a user or programmatic configuration adjustment. The SLOs 704, 706 change relatively infrequently in comparison to the first actual resource use 703 and the second actual resource use 705. For example, the SLOs 704, 706 change on the order of minutes, hours, days and weeks, the actual resource uses 703, 705 change on the order of microseconds and milliseconds.

For table 700, and subsequent descriptions in relation to FIGS. 8-10, a maximum available amount of the first resource is 10 units. For sake of illustration, the first resource is memory bandwidth usage as measured in units of gigabytes per second (GB/s). At the first time at 703, the first LS process is consuming the first resource at an actual resource use value of 0.1 GB/s, and the second LS process is consuming the first resource at an actual resource use value of 1.1 GB/s. Both the first LS process value and the second LS process value at 703 are each less than their respective SLOs at 704, and their total use is less than a total SLO for the first resource, which has a value of 4.0 GB/s at the first time.

Values, and the totals for the values, associated with consumption of the second resource by the LS processes at 705 and 706 are not discussed but are similarly treated and have similar relationships as the values and totals associated with the first resource. Values are shown for the actual use by the LS processes at 705, and variable name placeholders "SLO_2_1" and "SLO_2_2" are shown for the respective SLOs for these values at 706. Total placeholders "LT_A_2" and "SLO_T_2" are shown at 705 and 706, respectively. As understood by those in the art, these placeholders have values in an operating system.

The second portion 711 of the table 700 includes NLS processes 712, a third actual resource use 713 for each NLS process for the first resource, a first setpoint 714 for each NLS process for the first resource, a fourth actual resource use 715 for each NLS process for the second resource, and a setpoint 716 for each NLS process for the second resource. Any number of resource uses and corresponding setpoints for the NLS processes are tracked and incorporated into a control scheme illustrated by the second portion 711. At the first time at 713, the first, the second, and the third NLS processes are consuming the first resource at actual resource use values of 1.1 GB/s, 2.2 GB/s, and 3.3 GB/s, respectively, and each current use value is above its respective setpoint of 1.0 GB/s, 2.0 GB/s, and 3.0 GB/s at 714.

Values and the totals for the values associated with consumption of the second resource by the NLS processes at 715 and 716 are not discussed herein but are similarly treated and have similar relationships as the values and totals associated with the first resource for the NLS processes. Values are shown for the actual use by the NLS processes at 715, and variable name placeholders "STPT_2_1," "STPT_2_2," and "STPT_2_3" are shown for the respective setpoints for these NLS process use values at 716. Total placeholders "NT_A_2" and "T_T_2" are shown at 715 and 716, respectively. As understood by those in the art, these placeholders have values in an operating system.

In FIG. 7, at the first time, the values for the first and second LS process consumption of the first resource at 703 are below their respective first resource SLOs at 704 indicating that the LS processes are consuming the first resource below an available floor of 2.0 units (GB/s) at 704 for each of the LS processes. The values for the first, second, and third NLS process consumption of the first resource at 713 are above their respective process setpoints at 714 indicating that no limit or cap has been applied to any of the NLS processes. A limit may be referred to as a restriction, throttling, or a control. A control scheme includes a set of setpoints that serve as limits for one or more control cycles. At the first time, the NLS processes are allowed to consume the first LR at a higher rate than under a conventional limit control scheme where a total amount of 4.0 units (GB/s) reserved for the LS processes would have limited a total allowable consumption of 6.0 units (GB/s) by the NLS processes. Further, at the first time, the NLS processes are each allowed to consume the first resource beyond a conventional cap that would have been designated for each NLS processes as indicated at 714. Since the maximum available amount of the first resource is 10 units (GB/s), the total consumption of the first resource by the LS processes at 703 and by the NLS processes at 713 is and must be at or below the maximum available amount. At the first time, when consumption by the LS processes is combined with consumption of the NLS processes, the total is 7.8 units (GB/s) for the first resource, which is below the maximum of 10 units (GB/s). Consequently, at the first time, no resource sharing scheme is needed.

FIG. 8 is a table 800 illustrating the floors and the setpoints of the system at a second time along the timeline for an actively processing system. The floors are in an LS floor table 801 as a first portion of the table 800, and the setpoints are in an NLS setpoint table 811 as a second portion of the table 800. Table 800 is similar to the table 700 of FIG. 7, but is different in at least three aspects. First, the table 800 only has the first actual use values at 803 in the LS floor table 801 and corresponding SLOs at 804 for the first resource at 806 and not for the second resource, since control of only the first resource is described herein. Compared to the value in FIG. 7, the value for the first LS process has changed from 0.1 GB/s at 703 to 2.1 GB/s at 803. At the second time, the values for the second LS process consumption of the first resource at 803 is below its first resource SLO at 804 indicating that the LS process at the second time in the timeline, is consuming the first resource below an available floor of 2.0 at 804 for the second of the LS processes.

Second, the table 800 includes a first setpoint such as SL setpoint at 805 for each of the LS processes. At 805, the SL setpoint is at a value of 2.0 for both the first LS process and the second LS process. The SL setpoint is a value in the system (e.g., table 800, register 110, process schedule parameters 122) that is read by or provided to the SLO scheduler and acted upon by the SLO scheduler in relation to the first LS process and the second LS process indicated at 802 to effect changes to the actual use values at 803. According to some embodiments, the SLO scheduler uses a determined relationship among the control variables in the control scheme. The determined relationship may take the form of a predetermined model stored in or provided to the SLO scheduler or may be determined by historical observation by the SLO scheduler as a computing device operates. In an ideal system, the SLO scheduler uses the SL setpoint values at 805 to drive the system and change the values of the actual use at 803 by the processes toward the SLO values at 804 without violating other constraints in the system. According to some embodiments, a setpoint is provided based on estimating a use of the first resource at 803, 804 by the one or more of the LS processes 802 in a current control cycle or in a future control cycle.

Third, the table 800 includes a NLS limit at 815 (labeled as "NLS_1_LIMIT") for each of the NLS processes indicated at 812. At 815, according to some embodiments, the NLS limit is a maximum value that is adjusted by the SLO scheduler to throttle consumption of the first resource by the respective NLS processes 812. Once the NLS processes having setpoints at 814 have consumed a maximum amount of the particular resource, the processes are idled in the processor until the next control cycle or relevant time period corresponding to the setpoint. At the second time represented in FIG. 8, the actual consumption values 813 of the NLS processes 812 are above their first resource setpoints of 1.0 GB/s, 2.0 GB/s, and 3.0 GB/s, respectively, at 814 and no resource sharing scheme is needed for the NLS processes. None of the NLS processes are throttled due to excess availability of the first resource in the system as indicated by the sum of 3.2 GB/s and 6.6 GB/s being less than the 10 units (GB/s) available in the system. The total consumption of the NLS processes is 6.6 GB/s, which is above the setpoint total of 6.0 GB/s at 814. Such consumption is 0.6 GB/s better utilization by the NLS processes when considering conventional systems that would always reserve 4.0 GB/s for the LS processes at 802. Conventional systems would have capped the available consumption of the first resource by the NLS processes at 812 at 6.0 GB/s. When needed, the NLS limits at 815 are set above or below a respective first setpoint at 814 to reach a desired balance of consumption of the first resource between the LS processes at 802 and the NLS processes at 812. Further, the NLS limits at 815 may be set in order to reduce consumption of the first resource by the NLS processes where consumption of the first resource impacts or restricts consumption of another resource in the system. For example, where the first resource is a total number of memory requests in flight, NLS limits at 815 are placed on the NLS processes at 812 in order to hit a memory bandwidth limit or maximum, which is another resource or control variable in the system. Yet further, execution of the NLS processes indicated at 812 may also be throttled based on other inter-related variables in the system.

FIG. 9 is a table 900 illustrating the floors and the setpoints of the system at a third time along the timeline for an actively processing system. The floors are in an LS floor table 901 as a first portion of the table 900, and the setpoints are in an NLS setpoint table 911 as a second portion of the table 900. Table 900 is similar to the table 800 of FIG. 8, but is different in at least two aspects. First, certain values of the actual consumption of the first resource (memory bandwidth usage) by LS processes and NLS processes have changed relative to table 800. The actual consumption by each of the LS processes at 902 has changed to 1.8 GB/s—the first LS process consumption has decreased from 2.1 GB/s to 1.8 GB/s, and the second LS process consumption has increased from 1.1 GB/s to 1.8 GB/s. The total consumption by the LS processes of 3.6 GB/s at 903 is still below the total of 4.0 GB/s for the total of the respective SLOs at 904. The SL setpoints at 905 for each of the LS processes remain at a value of 2.0. Also, one of the NLS process consumption values has changed from 3.3 GB/s to 3.1 GB/s.

Second, the SLO scheduler placed a cap or maximum on the third NLS process at the third time. This limit (labeled "NLS_1_LIMIT") is indicated by the label "YES" at 915 indicating that the SLO scheduler is active in throttling the consumption of the first resource by the third NLS process as indicated by the 3.1 GB/s at 913 where the third NLS process is subject to a 3.0 setpoint at 914. The other setpoints at 914 remain the same for the first two NLS processes. The total consumption by the NLS processes at 913 has reduced to 6.4 GB/s, the maximum allowed at the third time due to the consumption by the privileged LS processes 902 consuming a total of 3.6 GB/s of the first resource leaving 6.4 GB/s that must be split between all NLS processes 912 as indicated at 913. The sum of the consumption of the first resource by the LS processes at 903 and by the NLS processes at 913 is 10.0 GB/s as a maximum available amount of the first resource. FIG. 9 illustrates a first control scheme to share the first resource whereby a controller or a scheduler such as the SLO scheduler 111 of FIG. 1 is programmed to reduce consumption of the first resource by a fewest number of NLS processes when a total of the NLS consumption needs to be throttled. In other embodiments, the SLO scheduler is configured to adjust some or all NLS processes 912 by an equal percentage thereby lowering an actual consumption at 913 by an equal percentage in order to accommodate the total NLS consumption which is maxed at 6.4 GB/s in this example. At the third time, no throttling of the LS processes 902 is needed or desired.

FIG. 10 is a table 1000 illustrating the floors and the setpoints of the system at a fourth time along the timeline for an actively processing system. The floors are in an LS floor table 1001 as a first portion of the table 1000, and the setpoints are in an NLS setpoint table 1011 as a second portion of the table 1000. Table 1000 is similar to the table 900 of FIG. 9 but is different in at least two aspects. First, certain values of the actual consumption of the first resource (memory bandwidth usage) by LS processes and NLS processes have changed relative to table 900. The actual consumption by the first LS process at 1003 has increased from 1.8 GB/s at 903 to 2.0 GB/s at 1003. The total consumption by the LS processes has risen to 3.8 GB/s at 1003, which is below the total of the respective SLOs at 1004. The SL setpoints at 1005 for each of the LS processes remain at a value of 2.0. At the fourth time, the LS processes at 1002 are demanding their guaranteed minimum values or SL guarantees, each 2.0 GB/s as indicated at 1004. At 1013, each of the NLS processes have been throttled downward relative to the values in FIG. 9 such that each NLS process is consuming less than in FIG. 9. The NLS processes are respectively consuming 1.0 GB/s, 2.0 GB/s, and 3.0 GB/s at 1013 for a total of 6.0 GB/s, which is the total available for consumption by all NLS processes in the second portion 1011 of table 1000.

Second, the SLO scheduler placed a limit on each of the NLS processes at the fourth time as indicated by the label "YES" at 1015 indicating that the SLO scheduler is active in throttling the consumption of the first resource by all of the NLS processes. The consumption of each of the NLS processes at 1013 has been reduced. The sum of the consumption of the first resource by the LS processes at 1003 and by the NLS processes at 1013 is 10.0 GB/s as a maximum available amount of the first resource. FIG. 10 illustrates another state of the first control scheme whereby a controller or a scheduler such as the SLO scheduler 111 of FIG. 1 is programmed to reduce consumption of the first resource by two or more of the NLS processes when a total of the NLS consumption needs to be throttled. One of a plurality of types of throttling algorithms may be applied to each respective NLS process. The type of throttling algorithm applied may be chosen based on one or more other variables such as a history of consumption of the first (or other) resource by the particular NLS process, a history of consumption of the first (or other) resource by all NLS processes, a history of consumption of the first (or other) resource by one of the LS processes, a history of consumption of the first (or other) resource by all LS processes, or combination of the same. Each of the NLS processes at 1012 has been reduced by a same fixed percentage of 10% at the actual values at 1013 when compared to the consumption values at 813 in table 800 of FIG. 8. The value of 1.1 GB/s has been reduced to 1.0 GB/s, the value of 2.2 GB/s has been reduced to 2.0, and the value of 3.0 has been reduced to 3.0. As shown in FIG. 10, the SLO scheduler is holding consumption by each of the NLS processes at 1013 to its setpoint at 1014 for one or more control cycles. When further restrictions or throttling is needed, one or more of the setpoints at 1014 is reduced in another control cycle, and one or more of the actual consumption values 1013 would responsively lower to meet the setpoints 1014 for the respective NLS process indicated at 1012. At the fourth time, no throttling of the LS processes 1002 is needed or desired. As shown in FIG. 10, the LS processes at 1002 are consuming at 1003 their guaranteed or contracted SLO values shown at 1004. The policy for the SLO scheduler is set in the SLO values at 1004 and the setpoint values 1014.

Figures 11, 12:
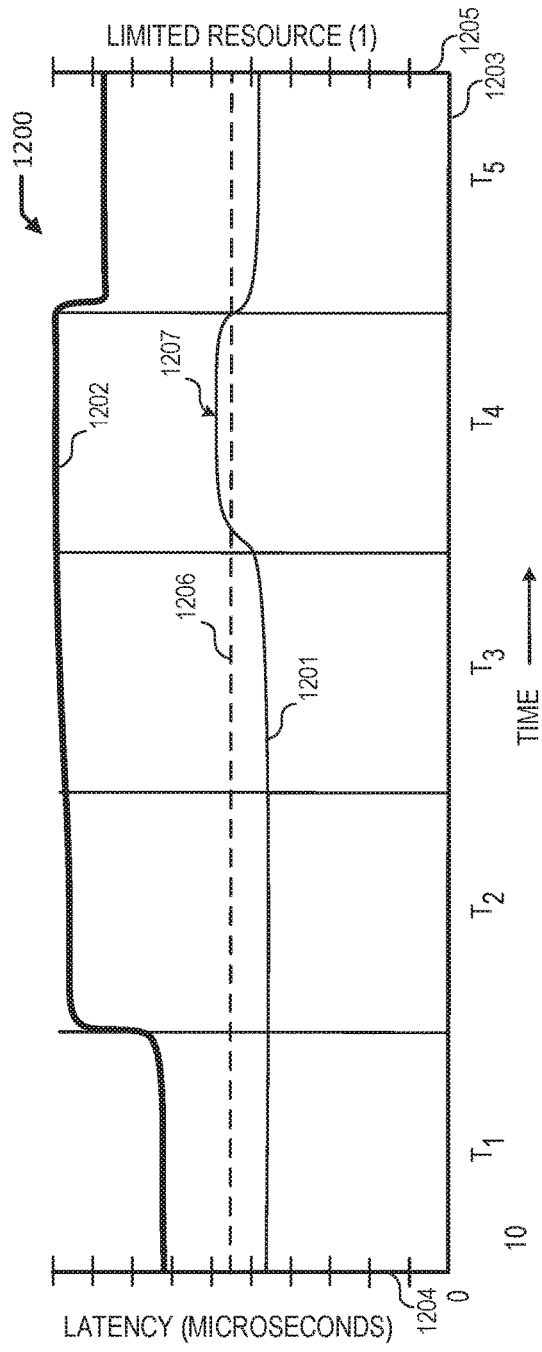

FIG. 11 is a table 1100 illustrating the floors and the setpoints of the system at a fifth time along the timeline for an actively processing system. Table 1100 is similar to the table 1000 of FIG. 10 but is different in at least two aspects. First, certain values of the actual consumption of the first resource (memory bandwidth usage) by NLS processes have changed relative to table 1000. The actual consumption by each of the NLS processes shown at 1112 has decreased. At 1113, each of the NLS processes has been throttled downward such that each NLS process is consuming less than in table 1000. The NLS processes are consuming 0.8 GB/s, 1.6 GB/s, and 2.6 GB/s, respectively, at 1013 for a total of 5.0 GB/s, which is less than the total available for consumption by all NLS processes in the second portion 1111 of table 1100. The SLO scheduler has reduced consumption by the NLS processes in order to meet a global latency requirement as further described below in relation to FIG. 12. The SLO scheduler has been configured to first reduce consumption of the first resource by the NLS processes in order to meet the global process latency goal. If reduction of the global latency goal is not attainable by throttling or reducing consumption of system resources by the NLS processes, the SLO scheduler is configured to also reduce consumption of the first resource by lowering the SLOs at 1104. In table 1100, the total consumption by the LS processes has increased to 4.0 GB/s at 1103 by allowing the consumption by the second process LS-PROCESS_2 to rise from 1.8 to 2.0 units, where 4.0 units is the same as the total of the respective SLOs at 1104. The SL setpoints at 1105 for each of the LS processes remain at a value of 2.0. At the fifth time, the LS processes at 1102 are demanding their guaranteed minimum values, each 2.0 GB/s and the LS processes are not in violation of failing to consume their respective floors of actual consumption of the first resource.

Second, the NLS processes indicated at 1112 are throttled below the 6.0 GB/s that is available for all NLS processes. At 1113, the actual total consumption by the NLS processes is 5.0 GB/s. In the second portion 1111 of the table 1100, the SLO scheduler has placed a setpoint or limit on each of the NLS processes at the fifth time as indicated by the label "YES" at 1115. The SLO scheduler is configured to take a variety of actions which includes actively throttling the consumption of the first resource by the NLS processes below an available amount of the first resource as needed to meet a system-wide objective. An objective may be referred to as a system-wide goal, a policy, a contract, a minimum, and a SLO. Compared to the values at 1013, the consumption of the first resource by each of the NLS processes at 1113 has been reduced. The sum of the consumption of the first resource by the LS processes at 1103 and by the NLS processes at 1113 are below the system maximum value for the first limited resource of 10.0 GB/s. FIG. 11 illustrates another state of the control scheme whereby a controller or a scheduler such as the SLO scheduler 111 of FIG. 1 is programmed to reduce consumption of the first resource by two or more of the NLS processes when a total of the NLS consumption needs to be throttled below an available amount of the first resource. The SLO scheduler is configured to throttle the same NLS processes with respect to the second resource, and any other resource that the NLS processes are consuming or impacting.

Table 1100 illustrates that the behavior of the NLS processes is still within control of the SLO scheduler because the actual consumption values at 1113 meet the setpoints for the NLS processes at 1114 even when the total available amount of the first resource (memory bandwidth usage) in the system (6.0 GB/s) exceeds the value of 5.0 GB/s assigned to the set of NLS processes shown at 1112. When further restrictions or throttling is needed, one or more of the setpoints at 1114 is further reduced, and one or more of the actual consumption values 1113 would lower to meet the setpoint 1114 provided as a setpoint for the respective NLS process at 1112. While not shown in table 1100, a NLS-versus-LS (NVL) throttling ratio is provided whereby a total NLS process consumption is reduced to the NVL throttling ratio over time, and then if further process throttling is needed, reduction in consumption of the first resource is spread over both LS processes and NLS processes. In that way, the NLS processes at 1112 are not all brought down to zero at 1113 at the expense of overly active LS processes at 1103. In general, at the fifth time, no throttling of the LS process use at 1103 is needed or desired. As shown in the first portion 1101 of the table 1100, the LS processes at 1102 are consuming certain amounts of the first resource at 1103 their guaranteed or contracted SLO values shown at 1104.

FIG. 12 is a graph illustrating a consumption of a resource and a memory latency over time for a computing system in accordance with some embodiments. Graph 1200 shows a first trace 1201 representing values of the memory latency in units of microseconds. The first trace 1201 represents the memory latency experienced by all the LS and NLS processes in the system and as illustrated in FIGS. 7-11. Graph 1200 also shows a second trace 1202 representing values of actual consumption of the total first resource (memory bandwidth usage) illustrated in FIGS. 7-11. A total consumption in the graph 1200 is 10 units (GB/s). Subdivisions of the system latency are shown along a first vertical axis 1204 of the graph 1200. Subdivisions of the total consumption are shown along a second vertical axis 1205 of the graph 1200.

Time is drawn along a horizontal axis 1203 of the graph 1200. Time is in units of control cycles of a processor. The horizontal axis 1203 is subdivided into five sections labeled $T_1$ through $T_5$. Each of the sections corresponds to one of tables 700, 800, 900, 1000, and 1100 where $T_1$ corresponds to table 700, $T_2$ corresponds to table 800, $T_3$ corresponds to table 900, $T_4$ corresponds to table 1000, and $T_5$ corresponds to table 1100.

Memory latency 1201 is below a system latency threshold 1206 for the first three sections $T_1$ through $T_3$. The latency threshold 1206 is a pre-determined threshold value that is based on an idle-system latency. For example, the latency threshold 1206 is at most one of: 1%, 2%, 2.5%, 3%, 5%, 7%, 10%, 12%, 15%, 20%, 25%, 30%, 35%, 40%, 45%, and 50% higher than the idle-system latency. In the fourth section $T_4$, actual memory latency 1201 spikes above the latency threshold 1206 at region 1207. The system is configured to control memory latency 1201. The system, by activating the SLO scheduler, programmatically is able to lower memory latency 1201 in the fifth section $T_5$ (relative to the fourth section $T_4$) to and below the latency threshold 1206. As shown in the fifth section $T_5$, the memory latency 1201 is at least somewhat dependent on changes in the values of the second trace 1202 in some conditions. The condition illustrated is in reduction of overall consumption of the first resource below its maximum of 10 GB/s by reducing consumption of the first resource by NLS processes. With reference to table 1100, memory latency 1201 is dependent on reduction of overall consumption of the first resource by the NLS processes at 912. Specifically, as shown in section $T_5$ of graph 1200, the SLO scheduler has reduced consumption of the first resource by each of the three NLS processes. The particular system configuration and control scheme shown in graph 1200 involves ensuring memory latency 1201 remains below the latency threshold 1206 even at the expense of allowing maximum use of the first resource.

Further, as evident from table 700, table 800, and table 900, and as evident in graph 1200, the SLO scheduler of the system is configured to keep two dependent variables of the system and the processor within desired ranges. In particular, the SLO scheduler is able to allow each LS process to consume the first resource at a respective floor, such as at a floor of 2.0 GB/s, and is able to keep the overall memory latency below the latency threshold 1206 by adjusting activity of the NLS processes as shown in graph 1200. According to some embodiments, one variable that the SLO scheduler uses to control memory latency 1201 below the latency threshold 1206 is an amount of memory prefetching for the processor or for each core in the processor.

In the example described in reference to FIGS. 7-12, the floor control variable has priority over the process latency variable, at least for a certain time period represented by the fourth section $T_4$ of the graph 1200. In sections $T_1$, $T_2$, and $T_3$ the system has been able to allow the NLS processes to use the excess bandwidth not committed to the LS processes. In window $T_4$, the system recognizes that the latency is above the contract latency and process LS2 is not meeting its floor as evident at 1003 in FIG. 10. By dynamically placing a cap or limit on the NLS processes, the system is able to bring LS2 back up to its allocated bandwidth by bringing down system latency in the fifth section $T_5$ at substantially all times, or at least over a substantial majority of time units or control time units.

According to other embodiments, as would be evident to one of skill in the relevant art, a processor and a SLO scheduler as described herein not only provides a LS process with a guaranteed floor for a resource but a contracted ceiling so as to shape process and system behavior to desired states at substantially all times over a substantial time horizon (e.g., minutes, hours, days, months).

Figure 13:
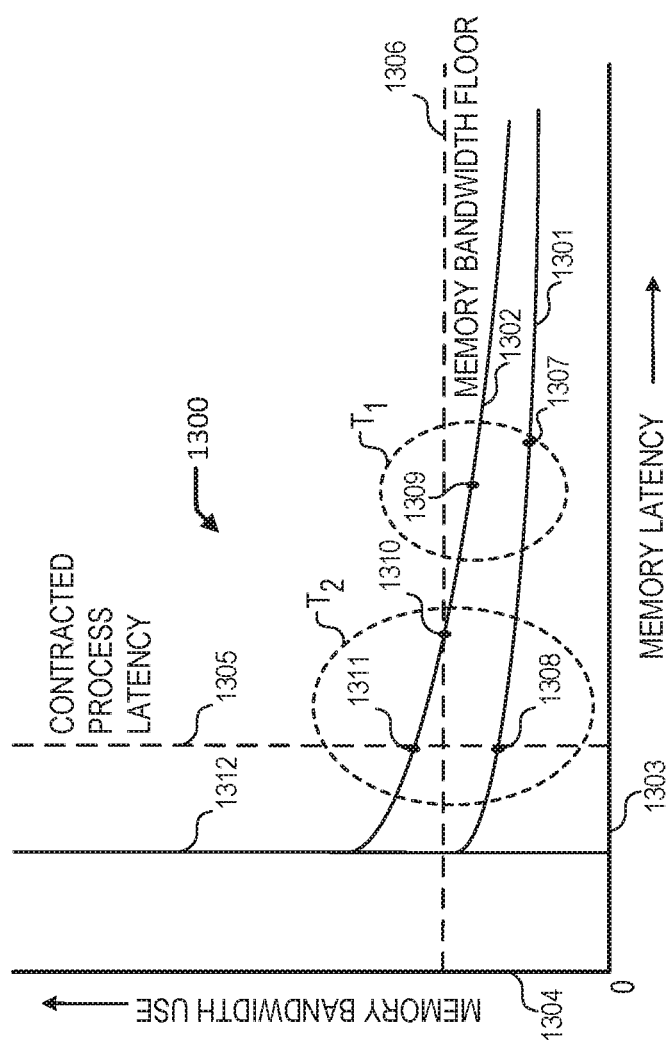
FIG. 13 is a graph illustrating memory bandwidth use versus memory latency for a process in a computing system in accordance with some embodiments.

FIG. 13 is a graph 1300 illustrating memory bandwidth use versus process memory latency for a single LS process operative in a computing system in accordance with some embodiments. FIG. 13 illustrates behavior of a processor and a result of actions taken by a SLO scheduler with respect to the particular process. A first correlation 1301 and a second correlation 1302 illustrate relationships between a memory latency 1303 and a memory bandwidth use 1304 associated with execution of instructions of the process by a processor under two sets of computing system conditions. The two correlations 1301, 1302 are two of a plurality of possible correlations for the particular process in the system. The correlations of the process in the computing system, including the two correlations 1301, 1302, are non-linear and are multi-relational: a plurality of variables in the system affect the behavior of the process including memory latency 1303 and memory bandwidth use 1304. For the purpose of illustration, the correlations 1301 and 1302 each persist for milliseconds or seconds while the control loop evaluates on a smaller timescale such as on the order of microseconds.

The SLO scheduler is tasked with bringing the behavior of the process within certain limits such as a contracted process latency 1305, a maximal allowable process latency, where the process behavior is to be kept at or under the contracted process latency 1305 at substantially all times where possible. The contracted process latency 1305 is a reasonable value above a physical computational minimum memory latency time 1312 below which no process, no matter how simple, can operate in the computing system even without any other process competing for a system resource. The contracted process latency 1305 as described herein is a contract between a hardware component or system and a human operator, not a contract between a human operator and a customer using the hardware component or system. The contract is set or identified during SLO scheduler configuration with the understanding that the particular computing system is capable of meeting contracted process latency 1305 or any other constraint provided to the SLO scheduler.

In FIG. 13, the SLO scheduler is also tasked with bringing the process behavior to (at or above) a memory bandwidth floor 1306 for the process when the process is requesting to use at least its memory bandwidth floor 1306. In sum, the SLO scheduler controls certain variables in a computing system in order to control at least the two dependent variables or behaviors 1303, 1304 of the particular process. When the process is not requesting at least its memory bandwidth floor 1306, then the SLO scheduler can allow the process to consume less than its guaranteed memory bandwidth floor 1306. According to some embodiments, when the process is requesting at least its memory bandwidth floor 1306, the desired behavior of the process for the two behaviors, memory latency 1303 and memory bandwidth use 1304, satisfy both conditions including the contracted process latency 1305 as illustrated at a third point 1311 along the second correlation 1302. According to other embodiments, the SLO scheduler satisfies one of the two conditions, which is illustrated at certain points along the correlations 1301, 1302 in FIG. 13.

The first correlation 1301 describes the process behavior when the system is under the first set of system conditions which includes a particular level of processor loading. For example, the first set of system conditions include a heavy load of a first set of active LS and NLS processes operative on the processor and a moderate amount of competition for memory bandwidth use by the processes. At a first time $T_1$, the process behavior is at a first point 1307 along the correlation 1301 corresponding to a memory latency that is above the contracted process latency 1305 for the process, and a memory bandwidth use below the memory bandwidth floor 1306. For sake of illustration, the process at all times including at $T_1$ is requesting at least its memory bandwidth floor 1306. Thus, at $T_1$, the SLO scheduler is in a violation of controlling the computing system to provide the process at least its memory bandwidth floor 1306, a constraint condition for the SLO scheduler.

Sometime after the first time $T_1$, at a second time $T_2$, the SLO scheduler has reduced the system latency by placing a cap on the NLS processes in the system. This has caused the behavior of the process to be at the second point 1308 along the first correlation 1301. According to some embodiments, the second time $T_2$ is a plurality of SLO scheduler control cycles after $T_1$. As shown, the process behavior is satisfying only one of two conditions at $T_2$ at the second point 1308: (1) reducing a memory latency to or less than the contracted process latency 1305, but not (2) providing at least the memory bandwidth floor 1306 that the process is requesting. Consequently, as indicated by the correlation 1301, the SLO scheduler would be in violation of meeting the memory bandwidth floor 1306. However, this set of conditions at the second point 1308 is the best the SLO scheduler can provide along the first correlation 1301. Thus, the SLO scheduler has met its contracted obligation for system latency and the LS process must not be demanding its memory bandwidth floor allocation and no further action on the part of the SLO scheduler is required. The cap on memory bandwidth consumed by the NLS processes could be achieved by any suitable means. According to one embodiment, a method includes reducing a number of available tokens of a pool of available tokens corresponding to the number of concurrent memory requests that are in process at a given time for a given NLS process. Accordingly, the particular process then is in less competition during the next control cycle or cycles for consuming memory bandwidth. This reduction in total demand for memory bandwidth reduces the memory latency experienced by all processes in the system.

The second correlation 1302 is one of a plurality of alternative correlations for the particular process within the computing system. Once the SLO scheduler has changed the system conditions such that the second correlation 1302 is in effect, or once the computing system has advanced to another state such that the second correlation 1302 is in effect, the behaviors of the particular process would change from a first point 1309 to another point along the second correlation 1302 under control of the SLO scheduler. For example, the behaviors of the process could be changed to a second point 1310 or to a third point 1311. The first point 1309 corresponds to a memory latency that is above the contracted process latency 1305 for the process, and a memory bandwidth use below its memory bandwidth floor 1306. The process has requested at time $T_1$ to be consuming memory bandwidth use 1304 at or above the memory bandwidth floor 1306. Point 1309 corresponds to a violation of both conditions for the particular process.

The second correlation 1302 is one of a plurality of alternative correlations for the particular process within the computing system which may occur at a different time. Once the second correlation 1302 is in effect, the behaviors of the particular process would change from a first point 1309 to another point along the second correlation 1302 under control of the SLO scheduler. For example, since the LS process is not consuming its bandwidth allocation, and the system latency is above the contract latency, the SLO scheduler needs to move the operating point of the LS process. By capping the bandwidth utilization of NLS processes in the system, the SLO scheduler reduces the total memory bandwidth demand in the system. In this way, the operating point of the LS process is changed to a second point along the correlation curve 1302.

Sometime after the first time $T_1$, at a second time $T_2$, the SLO scheduler has caused the behavior of the process to be at the second point 1310 or the third point 1311 by adjusting system conditions such that other processes (e.g., LS processes, NLS processes, both LS processes and NLS processes) are consuming less of the processor resources. As shown in FIG. 13, the process behavior for the particular process, at the second point 1310 is satisfying memory bandwidth use at or above the memory bandwidth floor 1306 when the process is in a state of requesting at or above this floor. At the third point 1311, the process behavior is also satisfying both conditions at $T_2$ along the second correlation 1302: (1) process memory latency is less than the contracted process latency 1305, and (2) memory bandwidth use is at or above its memory bandwidth floor 1306 when the process is in a state of requesting at or above this floor. Thus, at least for one control time cycle at the second time $T_2$, the SLO scheduler would not need to change system conditions further, by way of independent control variables, away from those corresponding to the second correlation 1302 applying to the behavior of the particular process. In fact, at the third point 1311, the SLO scheduler could increasingly reduce throttling on LS processes and NLS processes by following a method such as the one illustrated in FIG. 3. This could be considered an optimization of a third condition: to apply as little throttling as possible so that the overall system throughput is maximized while meeting the primary constraints.

In summary, with respect to FIG. 13, when the process characteristics over a given time interval are described by the first correlation 1301, the SLO scheduler is configured to drive process behavior to an intersection of the first correlation 1301 and the contracted process latency 1305. When, however, the LS process characteristics change and the process is described by the second correlation 1302, the SLO scheduler, according to a first embodiment, is configured to drive process behavior to an intersection of the second correlation 1302 and the memory bandwidth floor 1306. According to a second embodiment, the SLO scheduler is configured to drive process behavior to an intersection of the second correlation 1302 and the contracted process latency 1305. In general, the relationship between latency 1303 that the memory bandwidth 1304 a process consumes during some phase of operation is a function of the process of the corresponding software application operating on the particular computing system. The computing system adapts to accommodate a process that behaves for a period of time according to the first correlation 1301 and for other periods of time according to the second correlation 1302 where the process stays on one of those correlations 1301, 1302 for substantially longer than a control loop iteration time. That is, the system via the SLO scheduler has multiple adjustment periods to control the behavior of the process before the process correlation changes.

The example illustrated in FIG. 13 is applicable to other system-wide conditions and behaviors of other processes that are controlled by an embodiment of the SLO scheduler as described herein. In some embodiments, components of the SLO scheduler such as measurements or counts of process behaviors, a system latency threshold, LS floors, and NLS setpoints, and other components are stored in a data structure such as in a set of registers 110 of the processor 102 of FIG. 1. Further, the values for data structures may originate from the process schedule parameters 122 of a system memory such as the system memory 103 of FIG. 1. According to some embodiments, and as needed, the system latency threshold, the LS floors, the NLS setpoints, and other components are provided to the SLO scheduler, such as SLO scheduler 111 of FIG. 1, through a SLO scheduler API provided by an operating system such as through the SLO scheduler API 108 and OS 120 of FIG. 1, respectively. According to some embodiments, the SLO scheduler is configured for a particular process when an application is put into service by executing or launching the application within the operating system. For example, the system latency threshold, the LS floors, and the NLS setpoints for a particular process are provided to registers 110 for the SLO scheduler 111 of FIG. 1 when the application 121 is executed for a first time or when a copy of the application 121 is spawned by another process. The process schedule parameters 122 of FIG. 1, process correlations such as correlations 1301, 1302 of FIG. 13 are applied to operate a SLO scheduler such as the SLO scheduler 111 of FIG. 1.

In some embodiments, the apparatus and techniques described above are implemented in a system includes one or more integrated circuit (IC) devices (also referred to as integrated circuit packages or microchips), such as the processor 102 described above with reference to FIG. 1. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., RAM), non-volatile memory (e.g., ROM or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A processor to communicate with a system memory and an operating system, the processor comprising:
    a plurality of processor cores to execute a first process and a second process; and
    a scheduler configured to:
        store a system latency threshold;
        determine a system process latency violation of the system latency threshold by comparing the system latency threshold with a current system process latency; and
        schedule a use of a memory bandwidth by the second process until:
            a current use in a control cycle by the first process meets a first setpoint corresponding to the use of the memory bandwidth when the first setpoint is at or below a latency sensitive (LS) floor for the first process by controlling execution of the second process until the system process latency violation is resolved; or
            the current use in the control cycle by the first process exceeds the LS floor when the first setpoint exceeds the LS floor.

2. The processor of claim 1, wherein the scheduler is further configured to:
    determine the first setpoint by estimating a use of the memory bandwidth by the first process in a future control cycle.

3. The processor of claim 1, wherein:
    the LS floor corresponds to a limit of use of the memory bandwidth by a first core of the processor;
    the first setpoint for the first process is associated with the first core; and
    the current use by the first process is use of the memory bandwidth by the first core.

4. The processor of claim 1, wherein the scheduler is further configured to:
    throttle execution of the first process until the system process latency violation is resolved.

5. The processor of claim 1, wherein the scheduler is further configured to:
    generate a control scheme for the first process and the second process based on at least:
        a limit of the use of the memory bandwidth by the second process in a current control cycle; and
    apply the control scheme until the current system process latency is no longer in violation of the system latency threshold by:
        lowering the limit in a subsequent control cycle after the current control cycle.

6. The processor of claim 5, further comprising: a register for the system latency threshold, the register accessible via an application program interface (API) of the operating system upon launching of the first process in the operating system.

7. The processor of claim 1, further comprising:
    a register for the LS floor, wherein the register for the LS floor is accessible via an application program interface (API) of the operating system upon launching of the first process in the operating system.

8. A method comprising:
    determining, by a scheduler of a processor of a device, a current use of a memory bandwidth of the device by non-latency sensitive (NLS) processes executing on the processor of the device;

determining, by the scheduler, a current use of the memory bandwidth by a latency sensitive (LS) process executing on the processor;

determining, by the scheduler, an overall NLS throttling value when the current use indicates that the LS process fails to use at least an LS floor amount of the memory bandwidth when the LS process requests to use at least the LS floor of the memory bandwidth;

determining, by the scheduler, a throttling scheme for the NLS processes based on the overall NLS throttling value; and applying, by the processor, a first throttling to a first NLS process of the NLS processes based on the throttling scheme, the first throttling including a reduction of consumption of the memory bandwidth.

9. The method of claim 8, further comprising:

determining, by the scheduler, an amount of second throttling for the LS process when the LS process fails to use at least an LS floor amount of use and when the LS process requests to use at least the LS floor of the memory bandwidth; and applying, by the processor, the second throttling to the LS process for at least one control cycle.

10. The method of claim 8, wherein:

the processor is a multi-core processor including a first core and a second core;

the LS process executes on the first core in a control cycle; and the first throttling applies a reduction of consumption of the memory bandwidth by the second core in the control cycle.

11. The method of claim 8, wherein:

the processor is a multi-core processor including multiple cores; and the first throttling is applied to multiple threads of the first NLS process executing in a same control cycle.

12. The method of claim 8, further comprising:

implementing a latency throttling to the first NLS process or a second NLS process of the NLS processes by the scheduler when either of the first NLS process, the second NLS process, or the LS process is executing outside of a latency target for the device.

13. The method of claim 8, wherein:

the LS floor is an inbound network bandwidth floor for the LS process.

14. A computing processor comprising:

a first set of registers for storing a current use of a memory bandwidth of a device by non-latency sensitive (NLS) processes executing on the computing processor;

a second set of registers for storing a current use of the memory bandwidth by latency sensitive (LS) processes executing on the computing processor;

a third set of registers for storing an LS floor for the LS processes;

a fourth set of registers for storing an overall NLS throttling value for the NLS processes; and a scheduler to:

determine when one or more of the LS processes fails to use at least a respective LS floor amount of the memory bandwidth after the one or more LS processes request to use at least the LS floor of the memory bandwidth;

determine a set of throttling values for the NLS processes based on the overall NLS throttling value; and throttle use of the memory bandwidth by one or more of the NLS processes based on the set of throttling values.

15. The computing processor of claim 14, further comprising:

a fifth set of registers for storing an LS throttling value for the LS processes; and the scheduler further to:

determine an amount of LS throttling for the LS processes when one or more of the LS processes fail to use at least an LS floor amount of the memory bandwidth when the LS processes request to use at least its respective LS floor of the memory bandwidth; and throttling one or more of the LS processes based on the determined amount of LS throttling for at least one control cycle.

16. The computing processor of claim 14, wherein:

the computing processor is a multi-core processor including a first core and a second core;

the NLS processes execute on the first core in a control cycle; and throttling applies a reduction of consumption of the memory bandwidth by the first core in the control cycle.

17. The computing processor of claim 14, wherein:

the NLS processes include a first NLS process;

the computing processor includes multiple cores; and throttling is applied to multiple threads of a first NLS process executing in a same control cycle in the computing processor.

18. The computing processor of claim 14, wherein:

the NLS processes include a first NLS process; and the scheduler is further to:

apply a latency throttling to the first NLS process when an LS process is executing outside of a latency limit for the device.

19. The computing processor of claim 14, wherein:

the LS processes include a first LS process; and the scheduler is further to:

apply a latency throttling to the first LS process when any LS process is executing outside of a latency limit for the device.

* * * * *